Jan. 24, 1933. J. E. GREENAWALT 1,895,159
METHOD OF DISPOSING OF SEWAGE SLUDGE
Filed July 31, 1931
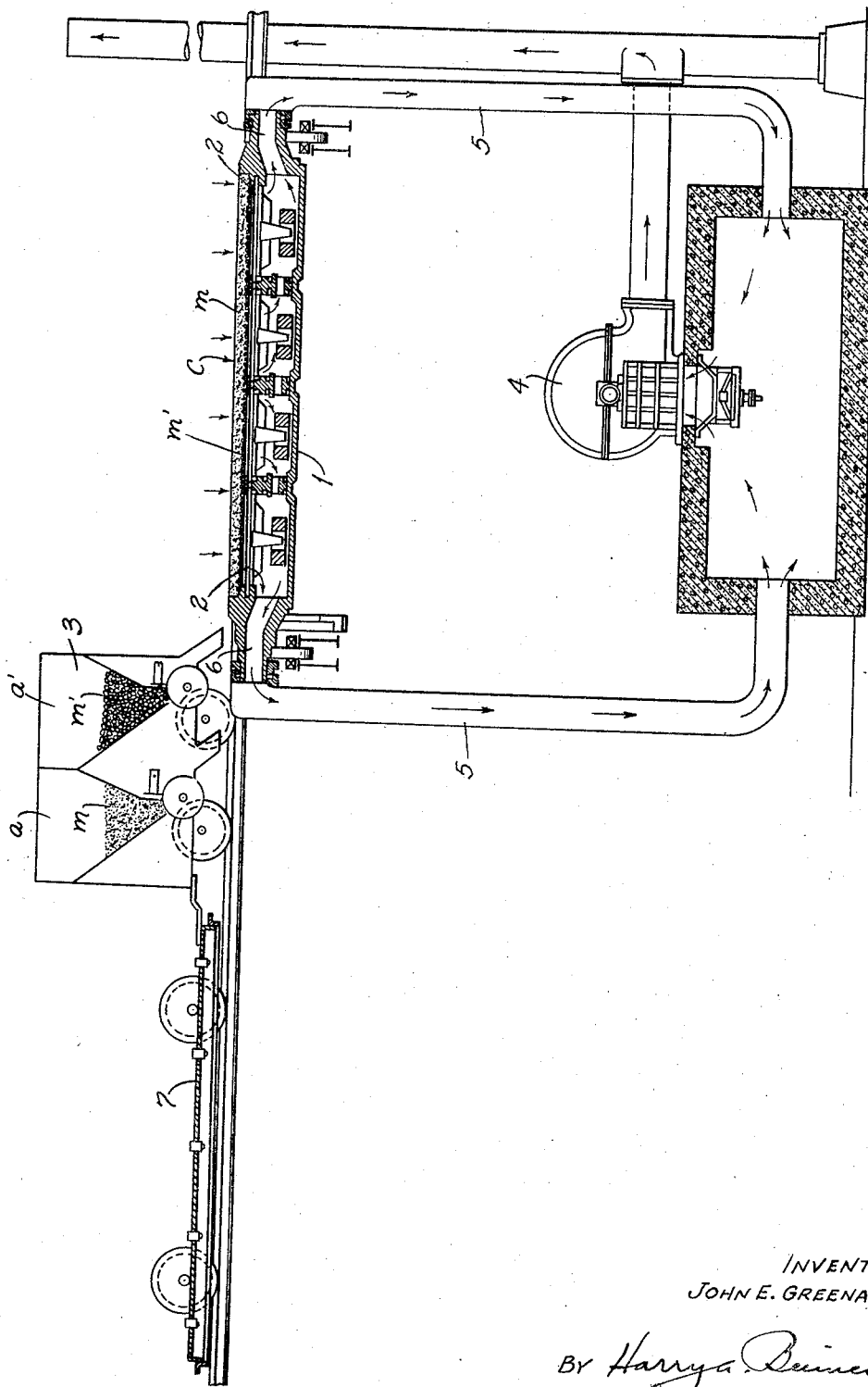
INVENTOR:
JOHN E. GREENAWALT.
By Harry A. Beiner
ATTORNEY.

Patented Jan. 24, 1933

1,895,159

UNITED STATES PATENT OFFICE

JOHN E. GREENAWALT, OF NEW YORK, N. Y.

METHOD OF DISPOSING OF SEWAGE SLUDGE

Application filed July 31, 1931. Serial No. 554,362.

My invention has relation to improvements in methods of disposing of sewage sludge and it consists in the novel manner of treating the same more fully set forth in the specification and pointed out in the claims.

The invention is particularly directed to the disposal of sludge obtained from sewage disposal plants and it consists in a heat treatment, whereby the sludge, as such, is completely destroyed and a new and useful product produced. The principal object of the invention is, of course, an economical disposal of the sludge, and a further object of the invention is to obtain from the process a useful product having entirely different properties than the mixture of material from which it was made.

The practice now largely adhered to at sewage disposal plants is to treat the sewage with certain chemicals which kill the bacteria and eliminate offensive odors and, at the same time, facilitate the settling of the solids suspended in the solution. This precipitate is the sludge that I propose to dispose of by my improved process.

Since the sludge is combined with considerable water, it is not easily disposed of by burning as it must be dried, and it is not particularly valuable as fertilizer. The sludge is sometimes formed into a cake by removing a large amount of the water by vacuum filtration, but the disposal of this material is also unsatisfactory, as the cost is excessive compared to the value of the fertilizer obtained.

My improved method of disposing of the sludge comprises burning it by a sintering operation. As is well known in the metallurgical industry, sintering contemplates the burning of a substance formed in a layer on a pervious hearth, or other support, the burning being dependent on fuel distributed throughout the mass of the substance and a blast of air continually passed through the mass until combustion is complete.

Obviously, the physical condition of the sludge, the sintering of which I am about to describe, is such that it could not be maintained on a pervious support, nor could air be passed through it, unless it is first properly prepared by the admixture of other substances. My invention contemplates the mixing of sludge with a water absorptive material in a loose condition, such as ashes, so that the pastiness of the sludge may be counteracted and enable the mass to be disposed in a porous layer. I have found by experience that 50% of sludge and 50% of ashes will produce a mixture that will form a satisfactory charge. The ashes produce a sufficient volume of voids in the charge to permit the passage of air therethrough, and the moisture gives the body of the charge the necessary firmness to enable it to withstand the blast of air applied for the purpose of supporting the combustion of the fuel in the charge. The fuel content of the charge is provided by the ashes as there is always some fuel present in ashes in the form of coal, or coke. Of course, if it should be found by trial that the ashes used do not contain sufficient fuel content to support combustion, it is a simple matter to add a small percentage of fuel in the shape of finely divided coal or carbon. In fact, additional fuel may be added, as sawdust, or any other combustible waste product, in a finely divided condition. Obviously, the charge may be modified, in that clay, or some other earthy substance may be substituted for the ashes, in which event additional fuel must be added, preferably of a bulky material, such as sawdust, or perhaps shavings. It should be borne in mind that the essential feature of the invention is the mixing of the sludge with some ingredient that will offset the excessive moisture in the sludge, and, at the same time, produce a charge containing voids to allow for the passage of air therethrough. Obviously there is considerable combustible matter in the sludge in the shape of organic compounds, which will burn in the course of the sintering operation and augment the fuel content of the charge. However, to depend on the combustible property of the sludge alone for maintaining combustion is not practical, since the sludge is not as easily kindled as the fuel imported with the ashes, or as a separate ingredient.

After the sludge has been embodied into a sintering charge as above explained, this sludge charge is arranged on a grate, or pervious support and ignited at its surface. Ignition is facilitated by the drafting of a blast of air downwardly through the charge, which also propagates the combustion of the fuel throughout the charge. The combustion proceeds downwardly through the charge substantially simultaneously throughout the extent of the charge, leaving behind a sinter, or porous agglomerate. This sintering action will be more easily understood by referring to the drawing in which a Greenawalt sintering apparatus is shown more or less conventionally.

In the drawing, 1 represents a sintering pan, or holder having a grate 2 for the support of the charge C. The charge C is lightly deposited and evenly distributed on the grate 2 by a charge car 3 designed for the purpose. This charge car may have two compartments $a$ and $a'$, one of which would hold the more finely divided component $m$ of the material to be treated, and the other the coarser component $m'$ of the material. In arranging the charge on the grate the coarser component of the material $m'$ will be first deposited, and the more finely divided component $m$ will be deposited on the coarser component. This method of arranging the charge insures a more even combustion and results in a product of substantially uniform density. Of course, it is not obligatory to arrange the charge in two components, as very satisfactory results are obtained when the charge car has but a single material hopper and the material is fed into the pan as a single layer.

A fan 4 is connected by means of conduits 5, 5 to hollow trunnions 6, 6 at the ends of the pan, and on putting the fan 4 into operation, a blast of air will be sucked downwardly through the charge. The charge is kindled at its surface by means of an ignition hood 7 which is removed just as soon as ignition is accomplished and combustion proceeds through the charge under the influence of the air blast. The air blast is continued until the charge has been completely sintered from top to bottom, after which the pan may be rotated on its trunnions and the resulting sintered product dumped. This sintered product is in the shape of a hard cellular cake, or porous agglomerate, and is suitable for use as an aggregate for concrete or any kindred purpose. Obviously, the physical properties of the sintered mass may be varied by varying the composition of the charge with respect to the addition of an inert substance and controlling the amount of fuel, so that a product having a wide range of properties and uses may be obtained.

Having described my invention, I claim:

1. The process of manufacturing a concrete aggregate which comprises thoroughly commingling sewage sludge with finely divided material capable of absorbing moisture, disposing said mixture as a layer on a pervious support, igniting the layer at one surface, and forcing air through said layer toward the opposite surface to cause combustion to proceed through the layer.

2. The process of manufacturing a concrete aggregate which comprises thoroughly commingling sewage sludge with finely divided moisture absorptive material and fuel in a finely divided condition, arranging said mixture as a layer on a pervious support, igniting the layer at one surface and forcing air through the layer toward the opposite surface to cause combustion to proceed through the layer.

3. The process of manufacturing a concrete aggregate which comprises thoroughly commingling sewage sludge with ashes, or similar material, in a finely divided state, arranging said mixture as a layer on a pervious support, igniting the layer at one surface and forcing air through said layer toward the opposite surface to cause combustion to proceed through the layer.

4. The process of manufacturing a concrete aggregate which comprises thoroughly commingling sewage sludge with a substantially equal quantity of ashes in a finely divided state, arranging said mixture as a layer on a pervious support, igniting the layer at one surface and forcing air through said layer toward the opposite surface to cause combustion to proceed through the layer.

5. The process of manufacturing a concrete aggregate which comprises thoroughly commingling sewage sludge with finely divided material capable of absorbing moisture, disposing said mixture as a layer on a pervious support, igniting said layer at the top and forcing air downwardly through the layer to cause combustion to proceed therethrough.

6. The process of manufacturing a concrete aggregate which comprises thoroughly commingling sewage sludge with ashes in a finely divided state, separating said mixture into two components according to size of particles, arranging the component of coarser particles in a layer on the pervious support, disposing the component of finer particles on said layer, igniting the charge thus formed at one surface and forcing air through the charge toward the opposite surface to cause combustion to proceed throughout the mass thereof.

In testimony whereof I hereunto affix my signature.

JOHN E. GREENAWALT.